United States Patent
Honda et al.

(10) Patent No.: US 11,052,910 B2
(45) Date of Patent: Jul. 6, 2021

(54) VEHICLE CONTROL APPARATUS

(71) Applicant: HONDA MOTOR CO., LTD., Tokyo (JP)

(72) Inventors: Shigehiro Honda, Wako (JP); Hiroshi Miura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 16/115,753

(22) Filed: Aug. 29, 2018

(65) Prior Publication Data
US 2019/0092326 A1 Mar. 28, 2019

(30) Foreign Application Priority Data
Sep. 25, 2017 (JP) .............................. JP2017-183793

(51) Int. Cl.
| | |
|---|---|
| *B60W 30/12* | (2020.01) |
| *B60R 11/04* | (2006.01) |
| *B60W 10/30* | (2006.01) |
| *B60W 40/06* | (2012.01) |

(52) U.S. Cl.
CPC ............ *B60W 30/12* (2013.01); *B60R 11/04* (2013.01); *B60W 10/30* (2013.01); *B60W 40/06* (2013.01); *B60W 2420/403* (2013.01); *B60W 2420/52* (2013.01); *B60W 2552/00* (2020.02); *B60W 2554/801* (2020.02); *B60W 2710/30* (2013.01); *B60W 2754/10* (2020.02)

(58) Field of Classification Search
CPC ...... B60W 30/12; B60W 10/30; B60W 40/06; B60W 2552/00; B60W 2754/10; B60W 2554/801; B60W 2420/403; B60W 2420/52; B60W 2710/30; B60R 11/04
See application file for complete search history.

(56) References Cited

U.S. PATENT DOCUMENTS

| | | | |
|---|---|---|---|
| 9,626,572 B2 | 4/2017 | Ishimaru et al. | |
| 10,289,920 B2 | 5/2019 | Hartmann | |
| 2007/0047809 A1* | 3/2007 | Sasaki ................ | G06K 9/00791 |
| | | | 382/170 |
| 2014/0081507 A1* | 3/2014 | Urmson ............... | B60W 40/06 |
| | | | 701/28 |
| 2016/0339959 A1* | 11/2016 | Lee ....................... | B60W 30/12 |

(Continued)

FOREIGN PATENT DOCUMENTS

| | | |
|---|---|---|
| JP | 2005-164492 A | 6/2005 |
| JP | 2010-247580 A | 11/2010 |

(Continued)

OTHER PUBLICATIONS

Japanese Office Action (w/ partial translation) issued for Japanese Patent Application No. 2017-183793 dated May 31, 2019.

*Primary Examiner* — Hunter B Lonsberry
*Assistant Examiner* — Elizabeth Yang
(74) *Attorney, Agent, or Firm* — Thomas | Horstemeyer, LLP

(57) ABSTRACT

A peripheral vehicle is detected from an image captured by a camera, and the tire grounded portion of the peripheral vehicle is specified. Whether the color of a peripheral region of the specified tire grounded portion is white is determined. If the color is white, it is determined that the road condition of a traffic lane where the peripheral vehicle is traveling is snow.

4 Claims, 6 Drawing Sheets

(56) References Cited

U.S. PATENT DOCUMENTS

| | | | |
|---|---|---|---|
| 2018/0059671 A1* | 3/2018 | Sogen | B60W 30/16 |
| 2018/0086373 A1* | 3/2018 | Tamura | B60W 30/18163 |
| 2020/0215994 A1* | 7/2020 | Bingle | B60R 1/04 |

FOREIGN PATENT DOCUMENTS

| | | |
|---|---|---|
| JP | 2013-213793 A | 10/2013 |
| JP | 2013-250874 A | 12/2013 |
| JP | 2017-503715 A | 2/2017 |

\* cited by examiner

VEHICLE CONTROL APPARATUS

BACKGROUND OF THE INVENTION

Field of the Invention

The present invention relates to a vehicle control apparatus for controlling the traveling of an automobile or the like by specifying the road surface condition.

Description of the Related Art

To implement automated driving of a vehicle, it is necessary to recognize the external environments (traveling environments) of the vehicle in addition to the traveling state of the vehicle itself, and secure the safety inside and outside the vehicle by controlling automated driving in accordance with the traveling state and external environments. One external environment is the friction coefficient of the road. Since a skid or slip may occur on a low-friction-coefficient road (a so-called low-μ road) such as a snowy road, traveling control matching the condition must be performed especially in automated driving. Therefore, a technique which determines the road surface condition, for example, determines accumulated snow from a white region in a captured image and a radar reflected wave (see, for example, Japanese Patent Laid-Open No. 2005-164492).

Unfortunately, this conventional technique may determine that there is snow on the road because of surrounding snow, although snow is removed from the road by snow clearing or snow melting. In this case, traveling control corresponding to snow is performed although there is no snow.

SUMMARY OF THE INVENTION

The present invention provides a vehicle control apparatus capable of specifying a more accurate road surface condition.

The present invention has the following arrangement.

That is, according to an aspect of the present invention, the present invention is a vehicle control apparatus comprising: an image capturing unit installed in a self-vehicle; and a road surface condition detecting unit for detecting a surface condition of a road, wherein the road surface condition detecting unit detects a peripheral vehicle and a color of a peripheral road of the peripheral vehicle from an image captured by the image capturing unit, and estimates a road condition based on the color.

The present invention can provide a vehicle control apparatus capable of specifying a more accurate road surface condition.

Further features of the present invention will become apparent from the following description of exemplary embodiments with reference to the attached drawings.

DESCRIPTION OF THE EMBODIMENTS

First Embodiment

Configuration of Vehicle Control Apparatus

Figure 1:
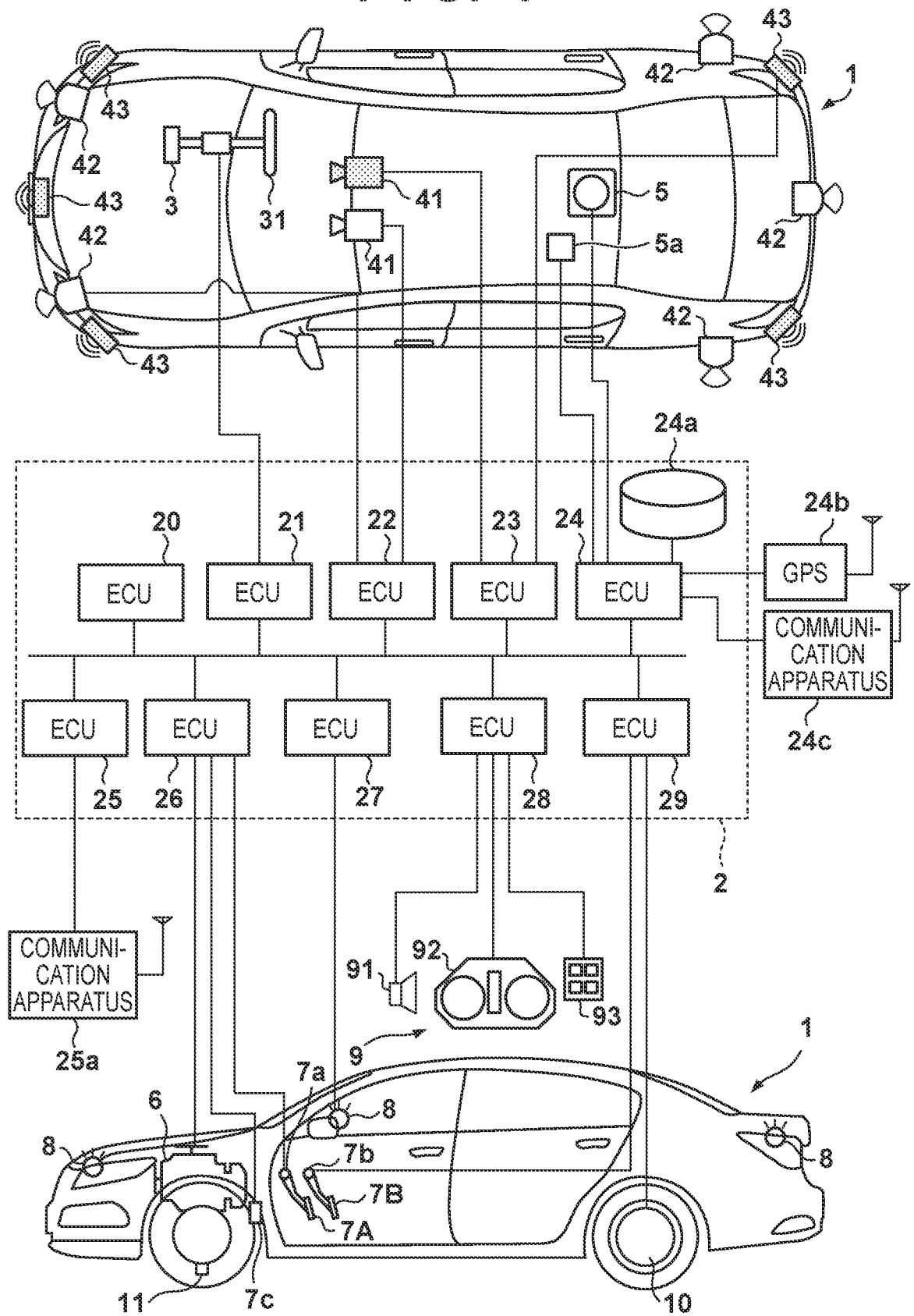
FIG. 1 is a view for explaining the configuration of a vehicle system.

FIG. 1 is a block diagram of a vehicle control apparatus according to an embodiment of the present invention, and this vehicle control apparatus controls a vehicle 1. FIG. 1 shows an outline of the vehicle 1 by a plan view and side view. As an example, the vehicle 1 is a four-wheeled sedan car.

The control apparatus shown in FIG. 1 includes a control unit 2. The control unit 2 includes a plurality of ECUs 20 to 29 communicably connected across an onboard network. Each ECU includes a processor such as a CPU, a storage device such as a semiconductor memory, and an interface for an external device. The storage device stores programs to be executed by the processor, data to be used by the processor in processing, and the like. Each ECU may also include a plurality of processors, storage devices, interfaces, and the like. That is, the ECU can also be called an information processing apparatus.

The functions of the ECUs 20 to 29 will be explained below. Note that it is possible to properly design the number of ECUs and their functions, so it is also possible to subdivide the functions more than those in this embodiment or integrate them.

The ECU 20 controls automated driving of the vehicle 1. In automated driving, the ECU 20 automatically controls at least one of steering and acceleration/deceleration of the vehicle 1.

The ECU 21 controls an electric power steering apparatus 3. The electric power steering apparatus 3 includes a mechanism which steers the front wheels in accordance with a driving operation (steering operation) performed on a steering wheel 31 by the driver. The electric power steering apparatus 3 also includes a motor for assisting the steering operation or generating driving power for automatically driving the front wheels, a sensor for detecting the steering angle, and the like. When the driving state of the vehicle 1 is automated driving, the ECU 21 automatically controls the electric power steering apparatus 3 in accordance with instructions from the ECU 20, thereby controlling the traveling direction of the vehicle 1.

The ECUs 22 and 23 control sensing units 41 to 43 for detecting the surrounding conditions of the vehicle, and perform information processing on the detecting results. The sensing unit 41 is a camera (to be referred to as a camera 41 in some cases hereinafter) for imaging a view in front of the vehicle 1. In this embodiment, two cameras 41 are installed in the front portion of the roof of the vehicle 1. It is possible to extract the contour of a target and extract a division line (for example, a white line) of a lane on the road by analyzing the images captured by the cameras 41.

The sensing unit 42 is a LIDAR (light detection and ranging) (to be referred to as a LIDAR 42 in some cases hereinafter). The LIDAR 42 detects a target around the vehicle 1, and measures the distance to the target. In this embodiment, five LIDARs 42 are installed, that is, one is installed in each corner of the front portion of the vehicle 1, one is installed in the center of the rear portion, and one is installed in each side of the rear portion. The sensing unit 43 is a millimeter-wave radar (to be referred to as a radar 43 in some cases hereinafter). The radar 43 detects a target around the vehicle 1, and measures the distance to the target. In this embodiment, five radars 43 are installed, that is, one is installed in the center of the front portion of the vehicle 1, one is installed in each corner of the front portion, and one is installed in each corner of the rear portion.

The ECU 22 controls one of the cameras 41 and each LIDAR 42, and performs information processing on the detecting results. The ECU 23 controls the other one of the cameras 41 and each radar 43, and performs information processing on the detecting results. Since the vehicle 1 includes the two sets of apparatuses for detecting the surrounding conditions of the vehicle, the reliability of the detecting results can be improved. It is also possible to multilaterally analyze the ambient environment of the vehicle because the vehicle includes the different kinds of sensing units, that is, the cameras, LIDARs, and radars. Devices for monitoring the external environment around the vehicle, such as the cameras 41, LIDARs 42, and radars 43, will also be called periphery monitoring apparatuses hereinafter.

The ECU 24 controls a gyro sensor 5, an acceleration sensor 5a, a GPS sensor 24b, and a communication apparatus 24c, and performs information processing on the detecting results or communication results. The gyro sensor 5 detects the rotary motion of the vehicle 1, for example, detects the angular velocity around the longitudinal axis of the vehicle 1, or detects the angular velocities around the vertical axis and left-and-right axis in addition to the angular velocity around the longitudinal axis. From the detecting result of the gyro sensor 5, the ECU 24 can also obtain the yaw rate (yaw angular velocity) of the vehicle 1. The course of the vehicle 1 can be determined from the detecting result of the gyro sensor 5, the wheel speed, and the like. The acceleration sensor 5a is, for example, a three-axis acceleration sensor for detecting the acceleration in each of the longitudinal direction, left-and-right direction, and vertical direction of the vehicle. The acceleration sensor 5a also functions as a vibration sensor for detecting the vibration (traveling vibration) when the vehicle travels. The GPS sensor 24b detects the present position of the vehicle 1. The communication apparatus 24c wirelessly communicates with a server which provides map information and traffic information, and obtains these pieces of information. The ECU 24 can access a map information database constructed in a storage unit 24a, and performs, for example, route search from the present position to the destination.

The ECU 25 includes a communication apparatus 25a for inter-vehicle communication. The communication apparatus 25a wirelessly communicates with other vehicles in the periphery, and exchanges information with these vehicles. The communication apparatus 25a can also perform road-to-vehicle communication with communication facilities arranged along the road. By this road-to-vehicle communication, the communication apparatus 25a can receive information provided by a server or the like, and can provide information to the server or the like. The communication apparatus 25a can also be used to obtain the above-described external information.

The ECU 26 controls a power plant 6. The power plant 6 is a mechanism which outputs driving power for rotating the driving wheels of the vehicle 1, and includes an engine and transmission. The ECU 26 controls the engine output in accordance with a driver's driving operation (an accelerator operation or accelerating operation) detected by an operation sensor 7a of an accelerator pedal 7A, and switches the gear ratio of the transmission based on information of the vehicle speed or the like detected by a wheel speed sensor 7c. When the driving state of the vehicle 1 is automated driving, the ECU 26 automatically controls the power plant 6 in accordance with instructions from the ECU 20, thereby controlling acceleration/deceleration of the vehicle 1. The ECU 27 controls lights including direction indicators (blinkers) 8.

The ECU 28 controls an input/output apparatus 9. The input/output apparatus 9 outputs information to the driver, and accepts information input from the driver. A voice output apparatus 91 notifies the driver of information by voices. A display apparatus 92 notifies the driver of information by displaying images. The display apparatus 92 is arranged, for example, in front of the driver's seat, and forms an instrumental panel or the like together with an input device 93. Note that voices and display are exemplified in this embodiment, but it is also possible to notify information by vibrations or light. Information can also be notified by combining some of voices, display, vibrations, and light. Furthermore, a combination or notification mode can be changed in accordance with the level (for example, the urgency) of information to be notified.

The ECU 29 controls a braking apparatus 10 and a parking brake (not shown). The braking apparatus 10 is, for example, a disk braking apparatus, and installed in each wheel of the vehicle 1. The braking apparatuses 10 decelerate or stop the vehicle 1 by applying a resistance to the rotation of the wheels. The ECU 29 controls the actions of the braking apparatuses 10 in response to a driver's driving operation (braking operation) detected by an operation sensor 7b installed in a braking pedal 7B. When the driving state of the vehicle 1 is automated driving, the ECU 29 automatically controls the braking apparatuses 10 in accordance with instructions from the ECU 20, thereby controlling deceleration and stop of the vehicle 1. The braking apparatuses 10 and parking brake can also be operated to maintain the stopped state of the vehicle 1. When the transmission of the power plant 6 includes a parking locking mechanism, this mechanism can be so operated as to maintain the stopped state of the vehicle 1. Furthermore, the ECU 29 receives a signal indicating the air pressure from an air pressure sensor 11 incorporated into, for example, an air valve of a tire, and monitors the signal value. The air pressure sensors 11 are incorporated into all tires, and transmit signals indicating the air pressures.

Configuration of Driving Assist System

Figure 2:
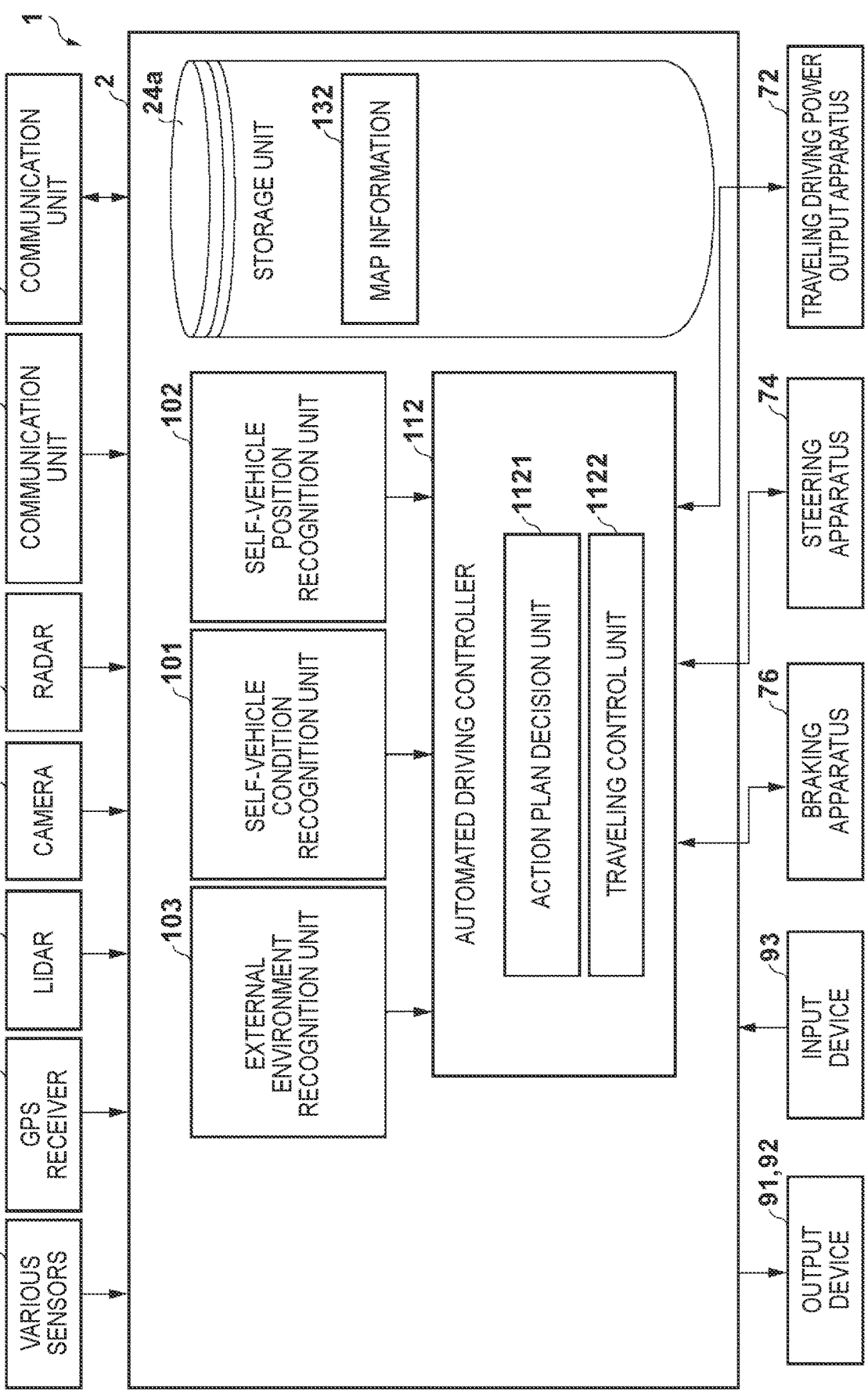
FIG. 2 is a block diagram showing an arrangement for controlling automated driving.

FIG. 2 shows an example in which a driving assist system for controlling automated driving and the like of the vehicle 1 is configured by functional blocks. Each functional block is implemented by, for example, the ECU, sensor, or driving device shown in FIG. 1 and a program to be executed by the ECU. The control unit 2 may also be configured by, for example, a computer, a program to be executed by the computer, and a memory. An automated driving control configuration including the control unit 2 as a main component will briefly be explained below.

Referring to FIG. 2, the control unit 2 is connected to a traveling driving power output apparatus 72, a braking apparatus 76, and a steering apparatus 74 as a driving apparatus control system. The control unit 2 is also connected to output devices including a voice output apparatus 91 and a display apparatus 92, and an input device 93. The control unit 2 is further connected to various sensors including the acceleration sensors 5a and air pressure sensors 11, the GPS receiver 24b, radars 43, cameras 41, LIDARs 42, and communication units 24c and 25a, and receive signals from these devices.

The control unit 2 includes an automated driving controller 112 for implementing automated driving by controlling, for example, the brakes, steering wheel, and driving power in accordance with the conditions. The automated driving controller 112 is connected to a self-vehicle position recognition unit 102, a self-vehicle condition recognition unit 101, and external environment recognition unit 103, and receives information recognized by these units. The automated driving controller 112 is also called a vehicle controller.

In the control unit 2, the self-vehicle condition recognition unit 101 specifies the condition of the vehicle 1 based on the yaw rate and direction input from the gyro sensor 5, or the acceleration input from the acceleration sensor 5a. The self-vehicle position recognition unit 102 specifies the self-vehicle position on the map by collating the self-vehicle position specified from a GPS signal or the like with map information 132. For example, it is possible to specify traffic influence information registered in association with each position on the map.

The external environment recognition unit 103 can recognize the external environment by processing information such as images of the external environment of the vehicle, which are detected by the cameras 41, radars 43, and LIDARs 42. The external environment includes an obstacle called a risk, and a travelable area in which the vehicle can safely travel. It is possible not only to simply recognize an obstacle as an obstacle but also to recognize the kind of the obstacle. In addition, the external environment is sometimes specified from the self-vehicle condition. For example, this embodiment determines the possibility of a low-µ road based on the vehicle signals (particularly the wheel signals). In this case, the signals from the acceleration sensor 5a, air pressure sensors 11, and the like are input to the external environment recognition unit 103.

Figure 3:
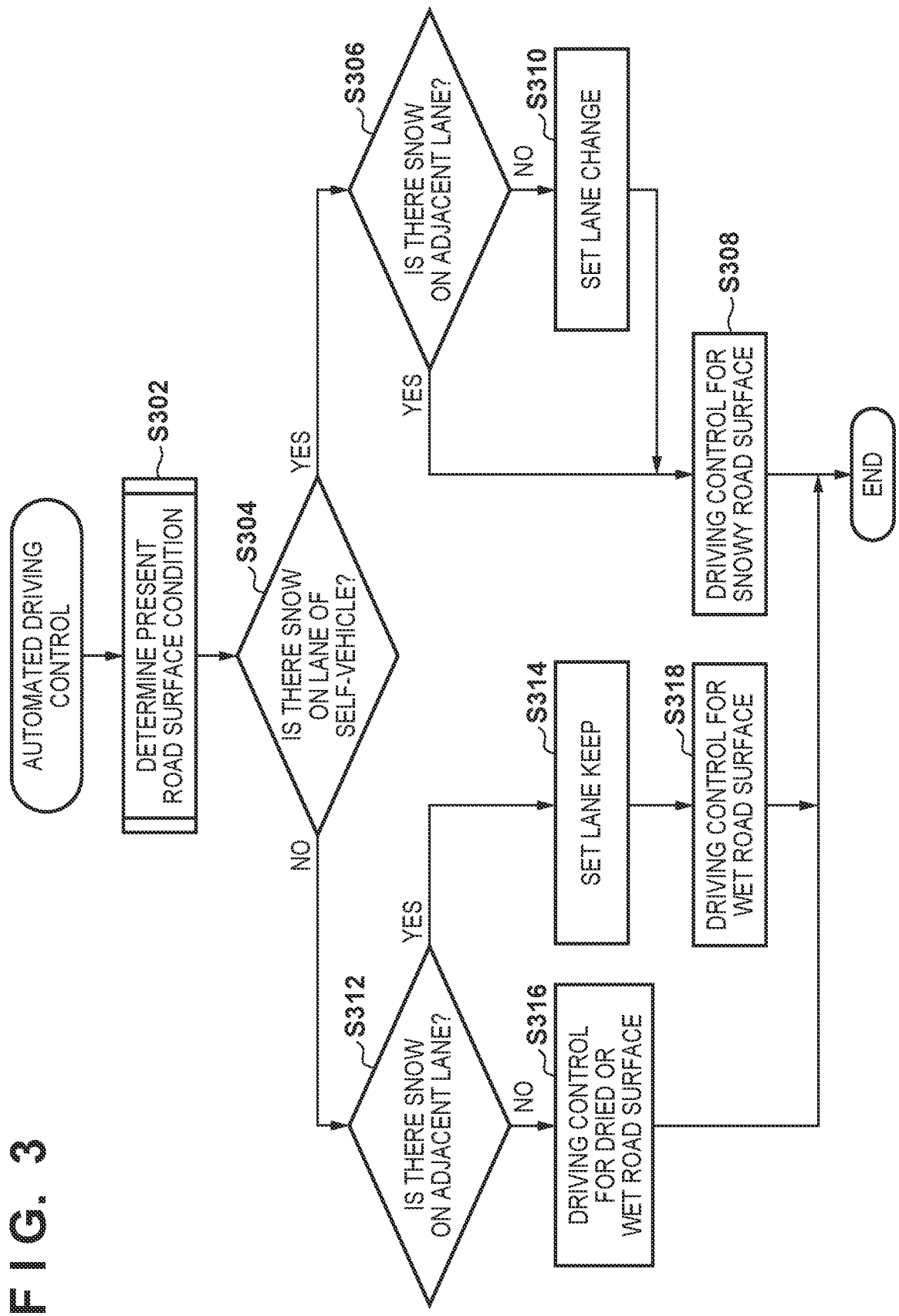
FIG. 3 is a flowchart showing an example of the control of automated driving.
Figure 4:
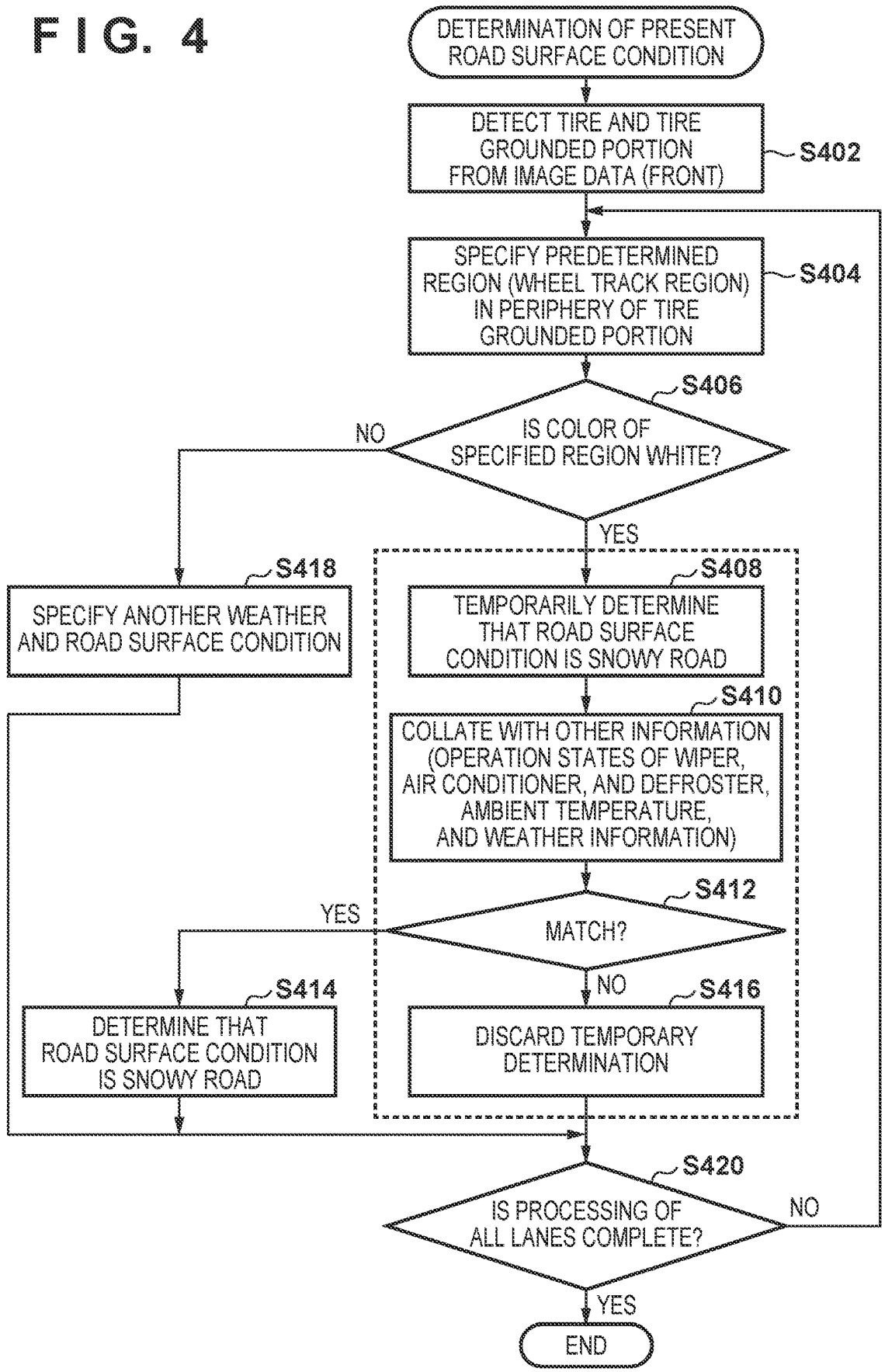
FIG. 4 is a flowchart showing an example of a process of specifying the road surface condition.
Figure 5:
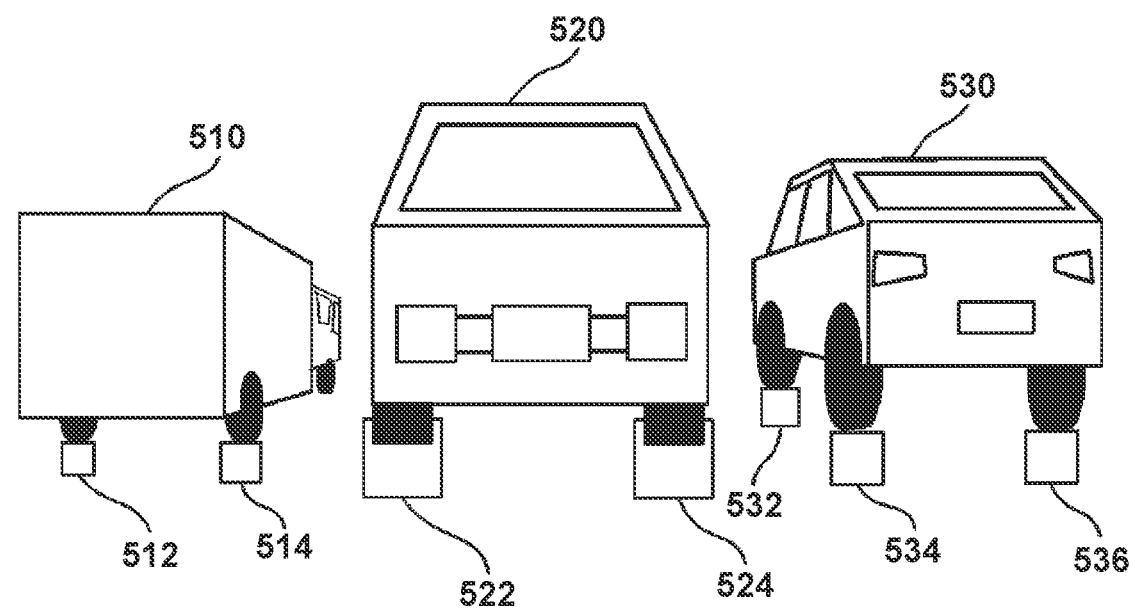
FIG. 5 is a view showing an example of an image region to be used to specify the road surface condition.

The automated driving controller 112 includes an action plan decision unit 1121 and a traveling control unit 1122. The action plan decision unit 1121 decides actions such as traveling, steering, and braking by using, for example, information input from the self-vehicle position recognition unit 102 and external environment recognition unit 103, in order to travel along a decided traveling route. The traveling control unit 1122 controls the braking apparatus 76, steering apparatus 74, and the traveling driving power output apparatus 72 such as the engine or motor, in accordance with the decided action plan. For example, the automated driving controller 112 performs control as shown in FIGS. 3 to 5.

The storage unit 24a is a memory or storage, and stores, for example, the map information 132 to be used in driving control. The storage unit 24a can also store a traveling route to a designated destination and the like.

As described above, the control unit 2 as the central unit of the automated driving system implements automated driving by controlling each device of the vehicle 1 based on, for example, the external environment information obtained by the sensors or communication. It is also possible to indicate the present position and guide the route to the destination by a navigation system (not shown).

Automated Driving Levels

Before the explanation of automated driving control according to this embodiment, the levels of automated driving will briefly be explained below. In this embodiment, automated driving is divided into four levels in accordance with the rate of automation. Level 1 is a stage in which the automated driving system performs one of driving, braking, and steering. Level 2 is a stage in which the automated driving system performs two or more of driving, braking, and steering. For example, level 2 includes following a preceding car and keeping a lane on a highway. Level 3 is a stage in which the automated driving system performs all of driving, braking, and steering in a limited environment, for example, on a highway. However, if a situation uncontrollable by the system occurs, takeover of driving to the driver is performed, so the driver must be prepared for takeover even during automated driving. Level 4 is a stage in which the driver does not take part in driving at all and the automated driving system implements complete automated driving. The driver can run the vehicle without driving it, like a passenger in a taxi. These levels can also be subdivided in accordance an operation to be automated. For example, sublevels of level 2 are levels 2B1 and 2E. On any level, the target to be controlled by the automated driving system is the same, but a standard required of the driver is changed. On level 2E, there is a so-called eyes-on requirement, so the driver must monitor the driving situation. On level 2B1, there is a so-called hands-on requirement, so the driver must hold the steering wheel and be prepared for immediate takeover. In either case, when a given level is changed to another level, the driver performs an operation which the automated driving system does not perform any longer, or the driver need not perform an operation which the automated driving system starts performing, in accordance with the changed level. When level transition occurs, notification is performed to alert the driver.

Outline of Accumulated Snow Detection

When a low-µ road surface such as accumulated snow is detected, the automated driving controller 112 (or the ECU 20) performs traveling control corresponding to the road surface condition. For example, if a low-µ road is detected when the vehicle is traveling on a dried road surface, the automated driving controller 112 changes the control contents, for example, lowers the level of automated driving by one or two stages, decreases the speed upper limit, or increases deceleration before a curve. It is also possible to change a traffic lane to lanes where no snow is found, or limit a lane change to lanes where snow is found. In this embodiment, snow is detected based on an image of the periphery of a preceding traveling vehicle, particularly, an image of the peripheries of tires. If a white region formed by accumulated snow or drifting snow is found in the peripheries of tires of a preceding vehicle, it can be estimated that the road surface condition is snow. The detection of the road surface condition and driving control according to this embodiment will be explained below.

Vehicle Control Process

FIG. 3 shows an example of the procedure of vehicle control performed by the automated driving controller 2. This procedure is executed by the ECU 20 (FIG. 1) as a main component on the hardware, but the automated driving controller 2 is a main component from the viewpoint of a software module. The process shown in FIG. 3 is, for example, periodically executed when the vehicle 1 is driven by the automated driving mode. The periods of execution can be switched in accordance with the ambient temperature or the like. In this case, when the ambient temperature becomes, for example, 0° C. or lower, the execution frequency can be made higher than that in a case in which the ambient temperature is higher than 0° C. This is so because the possibility of snowfall increases.

Referring to FIG. 3, the traveling environment, particularly, the present road surface condition is determined (or specified or estimated) (step S302). As will be explained in detail later with reference to FIG. 4, a snowy road is the target of a travelling environment to be specified in this embodiment. Also, the road surface condition is specified for each traffic lane. When the road surface condition is specified, it is determined that a traffic lane (to be referred to as a self-vehicle lane hereinafter) where the self-vehicle is travelling and its adjacent lanes are in a snowy state is determined (step S304). If it is determined that the self-vehicle lane is in the snowy state, whether the left- or right-side adjacent lane is in the snowy state is determined (step S306). If it is determined that all travelable lanes including the adjacent lanes are in the snowy state, the automated driving controller 112 performs driving control corresponding to a snowy road surface (step S308).

On the other hand, if it is determined in step S306 that there is a traffic lane in a non-snowy state, "lane change" (or "lane change recommended") is set in lane keep information (step S310). In this step, information indicating that the traffic lane in the non-snowy state is the left or right lane is also set. A traffic lane as the destination of change is the lane found to be in the non-snowy state. After that, the automated driving controller 112 performs driving control corresponding to a snowy road surface (step S308). In step S308, the automated driving controller 112 refers to the lane keep information. If the information is "lane change", the automated driving controller 112 controls the vehicle to travel by changing lanes at an appropriate timing to the lane on the set side. The "appropriate timing" can be the earliest timing at which lane change becomes possible. If there is no particular setting in the lane keep information, lanes can be changed as needed. Note that when the information is "lane change recommended", it is also possible to alert the driver so as to cause the driver to change lanes.

If it is determined in step S304 that the self-vehicle lane is not in the snowy state, whether one of the adjacent lanes is in the snowy state is determined (step S312). If it is determined that there is a traffic lane in the snowy state, "keep lane" (or "inhibit lane change") is set in the lane keep information (step S314). In this case, the automated driving controller 112 executes traveling control for a wet road surface by estimating that the self-vehicle lane is in a wet road surface condition (step S318). In step S318, the automated driving controller 112 refers to the lane keep information. If the information is "keep lane", the automated driving controller 112 controls the vehicle to travel while keeping the present lane unless lane change becomes necessary for a right turn or left turn. On the other hand, if it is determined in step S312 that there is no snow on the adjacent lanes, the automated driving controller 112 estimates that the self-vehicle lane is a dried road surface or wet road surface, specifies which of the two, and performs traveling control corresponding to the specified road surface condition (step S316). Whether the traffic lane is a dried road surface or wet road surface can be determined based on, for example, the captured images of the cameras 41, the determination of rain by the radars 43, or received weather information.

Determination of Road Surface Condition

The road surface condition determination process executed in step S302 will be explained below with reference to FIG. 4. First, from the images of a view in front of the vehicle, which are captured by the cameras 41, the tires and grounded portions of a peripheral vehicle, for example, a preceding vehicle are detected (step S402). The tire grounded portion will also be called a traveling road point in some cases. The preceding vehicle can be recognized from its shape or the like, and the tires can be specified by pattern recognition or the like from the shape and color viewed from behind the vehicle. When the whole vehicle is recognized, the tire positions can be estimated from the shape of the vehicle. As information as the material of estimation, information indicating the relationship between the vehicle shape and tire positions is stored in advance, and determination can be performed based on the information. In addition, the pattern for recognizing the vehicle and tire positions may also be learned by using machine learning. The preceding vehicle is not limited to a vehicle immediately before the self-vehicle, but includes a vehicle diagonally in front of the self-vehicle and traveling on an adjacent lane. If the preceding vehicle and its tire portions can be specified from the color (for example, black) or shape, the lower line of the tire is specified as the grounded portion. If the tire position cannot clearly be specified and can only be estimated, the grounded portion need not be specified. In addition to the recognition of the vehicle and tires, the traffic lane is also specified. If white lines drawn on the road can be specified, lanes can be divided by the white lines. If no white lines can be specified and a high-accuracy GPS and high-definition map are installed in the vehicle, the lane can be specified from the present position and map. It is also possible to determine the degree of overlap of the self-vehicle and preceding vehicle in the lateral direction, and determine the lane based on that. The last method will be explained later with reference to FIG. 6.

Steps S404 to S416 are executed for each traffic lane. A target lane will be called a lane of interest. If the road has two traffic lanes, these steps are repeated twice. First, a peripheral region of the grounded portion on the lane of interest, for example, a predetermined lower region (grounded region) is specified (step S404). Although this region is called a predetermined region, its size is not constant but changes in accordance with the distance to the preceding vehicle. However, the region may also have a predetermined size regardless of the distance. In this example, if the tire can be specified, the grounded region is a rectangular region having sides along the line of the grounded portion of the tire. On the other hand, if the tire cannot clearly be specified, the grounded region is a rectangular region including the estimated position of the tire. This region will also be called a grounded region. Then, whether the color of each grounded region on the lane of interest is white is determined (step S406). "White" need not be uniform white, and it is possible to determine that the grounded region is white if a predetermined ratio of the region is white. "White" may also be colored within a predetermined allowable range. Note that it is often possible to recognize the tires of both the left and right wheels of the preceding vehicle. In this case, if the grounded region is found to be white for at least one of the left and right wheels, it is possible to determine in step S406 that the grounded region is white. If it is determined in step S406 that the grounded region is not white, it is determined that the road surface condition of the lane on which the vehicle whose grounded portion is the grounded region as the determination target is traveling is not in the snowy state (step S418).

On the other hand, if it is determined in step S406 that the grounded region is white, it is temporarily determined that the road condition is a snowy road (step S408). This determined road surface condition "snowy road" is confirmed by collation with another information (step S410). The other information includes, for example, the operation state of wipers, the operation state of an air conditioner, the operation state of a defroster, the ambient temperature, and weather information. Information as a collation target can be any of these pieces of information. Whether the collation result indicates matching is determined (step S412). For example, if any of the wipers, air conditioner, and defroster is operating, this is the other information backing up "snowy road", so it is determined that there is matching. If none of these devices is operating, it can be determined that there is no matching. If the ambient temperature is lower than a predetermined temperature, for example, 10° C., it can be determined that there is matching. When the weather information can be obtained, it can be determined that there is matching if the weather information from the present time to a predetermined time in the present location contains information indicating snowfall.

If it is determined in step S412 that there is matching, it is finally determined that the road condition is a snowy road surface (step S414). On the other hand, if it is determined that there is no matching, the temporary determination in step S408 is canceled, and the original road surface condition is restored (step S416). Since the process of determining the road surface condition of the lane of interest is complete, the process is repeated from step S404 by changing the lane of interest until the determination is performed on all traffic lanes (step S420). If the processing of all traffic lanes is complete, the procedure shown in FIG. 4 is terminated. If the processing is not complete, the procedure is repeated from step S404 by focusing attention on an unprocessed traffic lane. This procedure shown in FIG. 4 determines the road surface condition of each traffic lane.

Note that the dotted-line rectangle surrounding steps S408, S410, S412, and S416 indicates that these steps can be omitted. That is, in this example, if it is determined in step S406 that the grounded region is white, the process branches to step S414, and it is determined, without any collation with the other information, that this road surface condition determined from the grounded region is the final road surface condition. Furthermore, the determination of "white" in step S406 need not be two-valued determination, and the determination result may also be three-valued. For example, if the ratio of the white portion in the grounded region exceeds a first predetermined ratio, the process branches to step S414. If this ratio is equal to or lower than a second predetermined ratio, it is determined that the grounded region is not white. In other cases, the process branches to step S408, and the road surface condition is collated with the other information.

FIG. 5 is a view showing an example in which vehicles and grounded regions are specified from the image captured by the cameras 41. In this example, the image contains a vehicle 520 on the same lane as that of the self-vehicle, a vehicle 510 on the left lane, and a vehicle 530 on the right lane. When these vehicles and their tires are recognized, rectangular regions below the tires are set as grounded regions 512, 514, 522, 524, 532, 534, and 536. The distances to these preceding vehicles are measured by the radars 43 and specified, and grounded regions having sizes corresponding to the distances are set. In this example, the tires of the vehicles 510 and 530 are clearly specified. In this case, predetermined regions below the tires are specified as the grounded regions. On the other hand, it is not possible to clearly specify the tires of the vehicle 520 due to drifting snow or the like. However, FIG. 5 shows the tires for the sake of convenience. In this case, the regions 522 and 524 including the estimated positions of the tires are set as the grounded regions.

Figure 6:
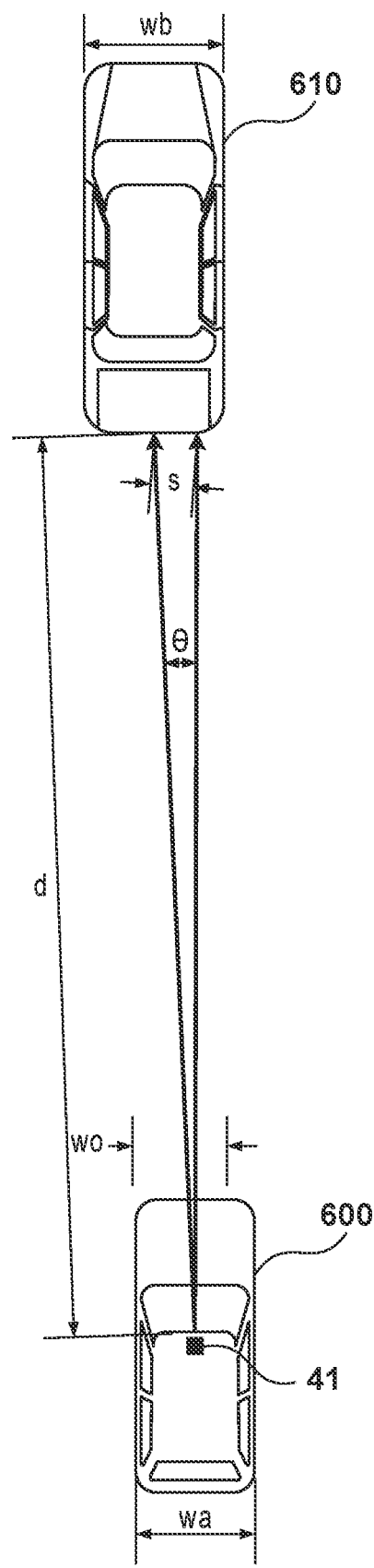
FIG. 6 is a schematic view showing an example of a process of specifying a preceding vehicle.

FIG. 6 is a view showing a method of specifying a preceding vehicle traveling on the same lane as that of the self-vehicle. It is possible to simply identify a vehicle traveling immediately before the self-vehicle as a preceding vehicle traveling on the same lane as that of the self-vehicle. However, vehicles sometimes travel while avoiding wheel tracks, so a preceding vehicle is not necessarily traveling in front of the self-vehicle. In this example shown in FIG. 6, therefore, a preceding vehicle overlapping the self-vehicle by the largest length in the widthwise direction is recognized as a preceding vehicle on the same lane as that of the self-vehicle. In FIG. 6, a distance d to the preceding vehicle is measured by the radars 43 or the like. A width wb of the preceding vehicle is specified from the distance d and the width detected from the image. A width wa of the self-vehicle is preset. An angle $\theta$ formed by the traveling direction of the self-vehicle and a line connecting the camera 41 (installed in the central portion in the widthwise direction of the vehicle) of the self-vehicle and the central portion in the widthwise direction of the rear portion of the preceding vehicle can be specified from the captured image of the camera 41. This is so because a predetermined distance from the central portion corresponds to a predetermined angle on an image. When the parameters are thus obtained, a distance s between the central portion of the self-vehicle and the central portion of the preceding vehicle in the widthwise direction is obtained by s≈d·θ. A width wo of the overlapping of the self-vehicle and the preceding vehicle of interest is wo=(wa+wb)/2−s. However, the maximum value of wo is wa and does not become larger than that. The minimum value of wo is 0. The width wo can also simply be calculated by wo=wa−s without obtaining wb by assuming that wa=wb.

When a plurality of preceding vehicles exist, the overlapping width wo is calculated for each vehicle following the above procedure. If there is a preceding vehicle for which wo satisfying wa−wo<threshold is obtained, this preceding vehicle can be decided as the preceding vehicle on the same lane as that of the self-vehicle. In addition, if there is a vehicle on the left or right side of this preceding vehicle, this vehicle cab be decided as a preceding vehicle on the left or right lane. Instead of this simple decision, it is, of course, also possible to obtain the distance s (that is, a shift from the self-vehicle) for each preceding vehicle by the above equation, and determine that the preceding vehicle is a vehicle on an adjacent lane if the shift is equivalent to the width of one traffic lane. As described above, traffic lanes can be identified not based on white lines on the road, but based on the image of preceding vehicles and information obtained from the radars and the like. This traffic lane specification method is, of course, merely an example, and it is also possible to recognize a traffic lane based on white lines recognized on an image if the white lines are usable, or recognize a traffic lane based on GPS information as described above.

According to the vehicle of this embodiment or the vehicle control apparatus of the vehicle, the above arrangements and procedures detect the color of the road surface in the periphery of the road points, that is, the tire grounded portions of the preceding vehicle, and estimate the condition (road condition) of the surface of the road. Then, automated driving control corresponding to the estimated road condition, for example, snowy or not snowy, can be performed. It is also possible to specify the road condition by referring to the grounded regions of a preceding vehicle traveling on the same lane as that of the self-vehicle, or the grounded regions of a preceding vehicle overlapping the self-vehicle most in the widthwise direction. This makes it possible to recognize the condition of the road on which the self-vehicle is going to travel. Furthermore, the recognition of the road conditions of adjacent lanes makes it possible to travel by selecting a traffic lane having a good condition, and reduce risks caused by lane change.

Other Embodiments

Also, lane keep is set in a case in which snow is not detected on the self-vehicle lane but detected on adjacent lanes. In this case, if snow is detected on the self-vehicle lane as the vehicle travels, the setting of lane keep may also be canceled. In addition, the automated driving controller 112 executes lane change and lane keep in the above embodiment, but it is also possible to alert the driver in order to recommend these operations.

In FIG. 5, the grounded region is the lower portion of the tire if the tire can clearly be specified. However, the grounded region may also include the road surface and the peripheral portion of the tire regardless of whether the tire can be specified.

Summary of Embodiment

A summary of this embodiment explained above is as follows.

(1)

There is provided a vehicle control apparatus comprising:
an image capturing unit installed in a self-vehicle; and
a road surface condition detecting unit for detecting a surface condition of a road,
wherein the road surface condition detecting unit detects a peripheral vehicle and a color of a peripheral road of the peripheral vehicle from an image captured by the image capturing unit, and estimates a road condition based on the color.

In this arrangement, the road condition can be estimated from the color of the periphery of the self-vehicle.

(2)

There is provided the vehicle control apparatus described in (1), wherein
the peripheral vehicle is a preceding vehicle of the self-vehicle, and
the road surface condition detecting unit detects a tire grounded point of the peripheral vehicle and a color of a periphery of the tire grounded point, and estimates the road condition based on the color.

In this arrangement, the road condition can correctly be detected from the grounded point.

(3)

There is provided the vehicle control apparatus described in (1) or (2), wherein the road condition includes presence/absence of snow.

In this arrangement, snow can be identified as the road condition.

(4)

There is provided the vehicle control apparatus described in any one of (1) to (3), wherein the road surface condition detecting unit collates the estimated road condition with one of operation states of a wiper, air conditioner, and defroster of the self-vehicle, and an ambient temperature detected by an ambient temperature sensor, and corrects the road condition in accordance with the result.

This makes it possible to further increase the reliability of the road condition estimated from the color of the region in the image.

(5)

There is provided the vehicle control apparatus described in any one of (1) to (4), wherein if a plurality of peripheral vehicles exist, the road surface condition detecting unit specifies a vehicle traveling on the same lane as that of the self-vehicle, or a vehicle having a widest range overlapping the self-vehicle in a lateral direction, and estimates the road condition based on a road color of the corresponding vehicle.

In this arrangement, the road condition can be estimated more reliably by estimating the road condition from a traveling vehicle close to the self-vehicle.

(6)

There is provided the vehicle control apparatus described in any one of (1) to (5), further comprising an automated driving control unit for controlling automated driving of a vehicle,
wherein the automated driving control unit inhibits lane change of the self-vehicle if the peripheral vehicle is a vehicle traveling on another lane different from a lane on which the self-vehicle is traveling and the road condition of the other lane is snow.

This arrangement makes it possible to correctly detect the occurrence of a risk with respect to lane change.

(7)

There is provided the vehicle control apparatus described in (6), wherein the automated driving control unit cancels the inhibition of lane change if the road condition of the other lane is snow and the lane on which the self-vehicle is traveling is also snow.

In this arrangement, lane change is permitted if both the traffic lane where the self-vehicle is traveling and an adjacent lane are snowy.

(8)

There is provided the vehicle control apparatus described in any one of (1) to (7), wherein if the road condition of the other lane different from the lane on which the self-vehicle is traveling is not snow and the road condition of the self-vehicle lane is found to be snow, the automated driving control unit changes the lane to the other lane or recommends the driver to perform lane change.

This arrangement enables the vehicle to travel on a traffic lane having no snow on it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-183793, filed Sep. 25, 2017, which is hereby incorporated by reference herein in its entirety.

What is claimed is:

1. A vehicle control apparatus installed in an ego vehicle, comprising:
an image capturing unit; and
a road surface condition detecting unit for detecting a surface condition of a road,
wherein the road surface condition detecting unit detects a preceding vehicle of the ego vehicle, a tire grounded point of the preceding vehicle and a color of a grounded region that is below the tire grounded point from an image captured by the image capturing unit, and estimates that a road condition is snow based on the detected color being white, and
wherein when a plurality of preceding vehicles exist, the road surface condition detecting unit specifies a vehicle traveling on the same lane as that of the ego vehicle or a vehicle having a widest range overlapping the ego vehicle in a lateral direction from the plurality of preceding vehicles, and estimates the road condition based on a color of the grounded region of the specified vehicle,
wherein the road surface condition detecting unit collates the estimated road condition with one of operation states of a wiper, air conditioner, and defroster of the ego vehicle, and an ambient temperature detected by an ambient temperature sensor, and corrects the road condition in accordance with the result.

2. The apparatus according to claim 1, further comprising an automated driving control unit for controlling automated driving of a vehicle, wherein the automated driving control unit inhibits lane change of the ego vehicle if the preceding vehicle is a vehicle traveling on another lane different from a lane on which the ego vehicle is traveling and the road condition of the other lane is snow.

3. The apparatus according to claim 2, wherein the automated driving control unit cancels the inhibition of lane change if the road condition of the other lane is snow and the lane on which the ego vehicle is traveling is also snow.

4. The apparatus according to claim 2, wherein if the road condition of the other lane different from the lane on which the ego vehicle is traveling is not snow and the road condition of the ego vehicle lane is found to be snow, the automated driving control unit changes the lane to the other lane or recommends the driver to perform lane change.

\* \* \* \* \*